Figure 1:
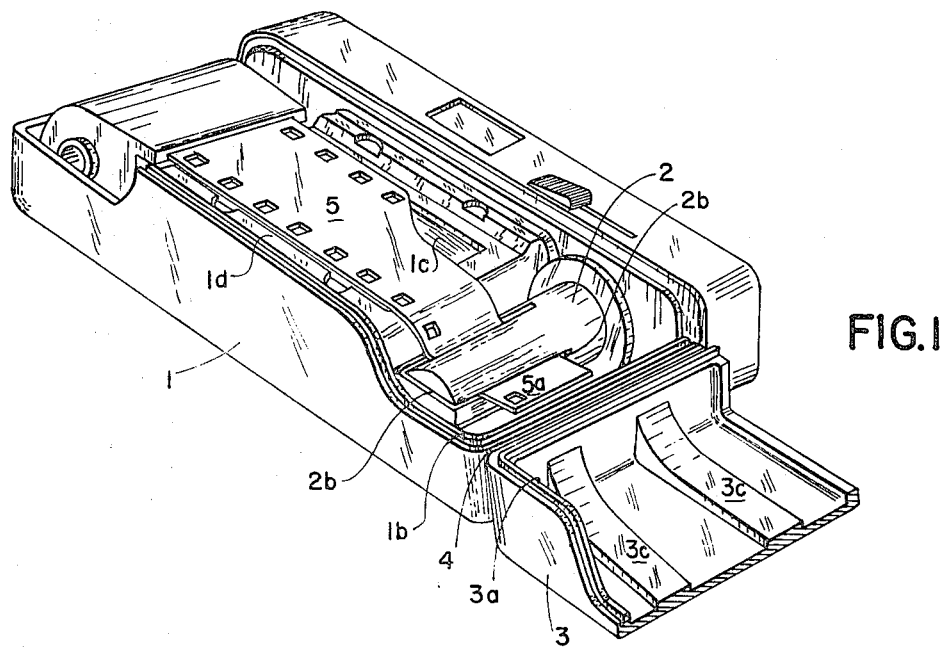

United States Patent [11] 3,541,935

| [72] | Inventors | Kurt Steisslinger<br>Stuttgart-Hedelfingen;<br>Horst Simon, Fellbach near Stuttgart,<br>Germany |
|---|---|---|
| [21] | Appl. No. | 658,091 |
| [22] | Filed | Aug. 3, 1967 |
| [45] | Patented | Nov. 24, 1970 |
| [73] | Assignee | Eastman Kodak Company<br>Rochester, New York<br>a corporation of New Jersey |
| [32] | Priority | Sept. 10, 1966 |
| [33] | | Germany |
| [31] | | No. K55470 |

[54] PHOTOGRAPHIC OR CINEMATOGRAPHIC CAMERA WITH A LABYRINTH SEAL
5 Claims, 3 Drawing Figs.

[52] U.S. Cl. .................................................. 95/11, 95/31
[51] Int. Cl. ..................................................G03b 19/04
[50] Field of Search........................................... 95/11, 22, 31, 34, 67; 242/71.1, 55.13; 352/78

[56] References Cited
UNITED STATES PATENTS

| 2,581,691 | 1/1952 | Moomaw et al. | 95/31UX |
| 2,735,772 | 2/1956 | Mihalyi | 95/31 |
| 3,412,662 | 11/1968 | Balalis | 95/11 |
| 3,420,154 | 1/1969 | Lieser et al. | 95/31 |

FOREIGN PATENTS

| 1,073,297 | 1/1960 | Germany | 95/67 |

*Primary Examiner*—John M. Horan
*Assistant Examiner*—Fred L. Braun
*Attorneys*—Robert W. Hampton and Ronald S. Kareken ABSTRACT: A camera including a case part and a closable cover each having edges which mate to form a labyrinth seal for preventing light from entering the camera when the cover is closed. The labyrinth seal is formed so that any part of the film, such as the leader end, that may have entered the labyrinth seal can be removed from the seal during film wind even when the camera back is closed. The parts forming the seal may be designed and spaced to enable the film end to be removed through a tortuous path, or resilient material may be used to form portions of the seal, the resilient material being flexed during film wind to permit withdrawal of the film end.

Patented Nov. 24, 1970     3,541,935

KURT STEISSLINGER
HORST SIMON
INVENTORS

BY *Ronald S Kaulen*
*Robert W Hampton*
ATTORNEYS 3,541,935

PHOTOGRAPHIC OR CINEMATOGRAPHIC CAMERA WITH A LABYRINTH SEAL

Reference is made to the following commonly assigned copending application: U.S. application Ser. No. 505,298, entitled Photographic Camera, filed Aug. 27, 1965 in the names of Ernest Lieser et al. and now U.S. Pat. No. 3,433,143.

This invention relates to photographic or cinematographic cameras and more particularly to such cameras having labyrinth seals provided between the respective camera case or body and back to prevent light from entering into the camera interior.

Many forms of labyrinth light seals between relatively movable parts of a camera such as the case and back are known in the art. In photographic cameras of the conventional type, the walls of the parts forming the labyrinth seal in most instances are closely spaced, and light protecting strips in the form of felt or the like may be incorporated therein to ensure light tightness.

In a recently developed invention for simplified loading of film in a camera, disclosed for example in copending application Ser. No. 505,298, filed Aug. 27, 1965, now U.S. Pat. No. 3,433,143, the film leader end projects over the takeup spool and is wound around the latter together with the main portion of the film roll. If the film is inserted in an awkward manner, the leader end may enter between the parts forming the labyrinth seal and become caught when the camera back is closed, which may prevent film wind or cause the film to tear. The present invention, particularly useful in such simplified loading cameras, eliminates this disadvantage. According to the present invention, the labyrinth seal, defined by the camera case and back to prevent light from entering the camera interior, is formed at least in the film guiding or receiving part of the camera in such a manner that any part of the film such as the leader end that may have entered the labyrinth seal can be removed from the seal during film wind even when the camera back has been closed. In one embodiment of the invention, the parts forming the seal are designed and spaced to enable the film end to be removed through a tortuous path. In a second embodiment, resilient material is used to form portions of the seal, the resilient material being flexed during film wind to permit withdrawal of the film end.

Figure 2:
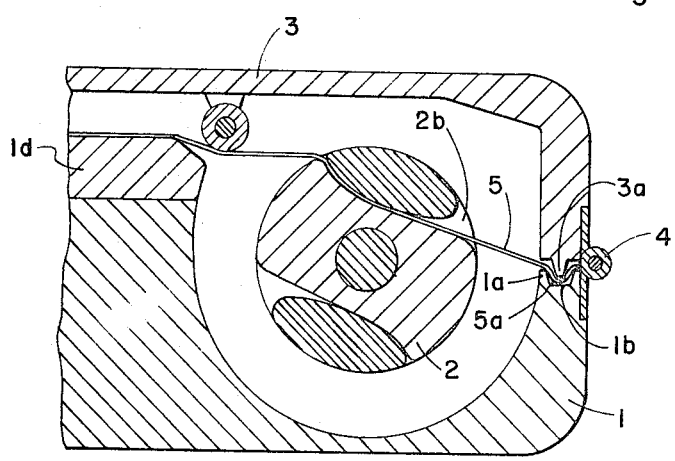
Figure 3:
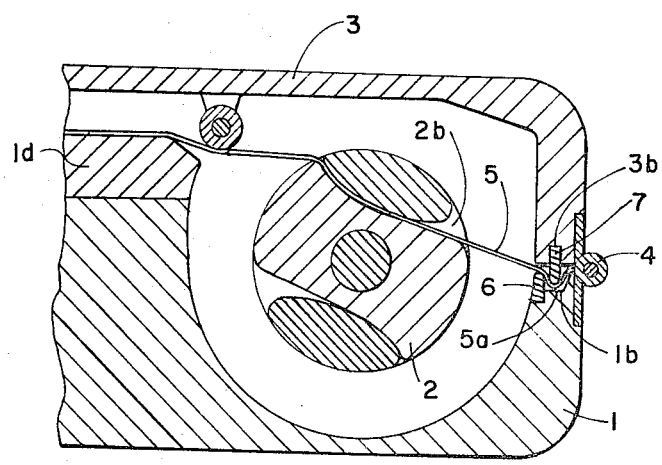

The present invention as well as objects and advantages of the invention will become more apparent from the following description of these two embodiments of the invention as shown in the accompanying drawing, in which:

FIG. 1 is a partial perspective view showing a photographic camera embodying the present invention;

FIG. 2 is a sectional plan view of a part of the photographic camera shown in FIG. 1, in which the labyrinth seal according to the invention is formed by the relative positioning and geometry of the camera parts; and FIG. 3 is a sectional plan view of a part of the photographic camera shown in FIG. 1, in which the labyrinth seal according to the invention is formed at least in part by resilient material.

FIG. 1 of the drawing shows a simplified loading photographic camera suitably embodying the present invention. The camera, more fully described in the above mentioned copending application, comprises a case or body 1 having a rear cover 3 pivotally mounted on one end thereof by means of a hinge 4. A takeup spool 2 is rotatably mounted within a cavity of the case 1 adjacent hinge 4 and is rotated upon movement of a film transport mechanism in a known manner. A second cavity in the case 1 opposite the takeup spool 2 is adapted to receive a film supply means, shown here as a cassette containing a preloaded roll of film 5.

The case 1 defines a film gate 1d and an exposure aperture 1c over which the film 5 is transported from the cassette to the takeup spool 2 by operation of the film transport mechanism. Takeup spool 2 is provided with at least one axial slot 2b adjacent a recessed portion of the case 1 to receive the leading portion 5a of the film 5 by initially inserting the edge of the portion 5a into the slot 2b as shown.

After insertion of the film in the above manner, the camera back 3 is closed. Upon movement of the back 3 to its closed position, the leading portion 5a of the film 5, if extending substantially beyond spool 2, is engaged by the arcuate surfaces 3c and other surfaces of the cover 3 to position the end 5a over spool 2 in the cavity containing the spool. The film 5 then will be secured to the takeup spool 2 soon after film transport is commenced.

If, however, upon film loading the leading edge of portion 5a did not extend far enough beyond spool 2 to be engaged by cover surfaces 3c, it is possible that this leading edge may become caught in the seal formed at hinge 4 when the cover 3 is closed. To ensure proper operation in such cases as provided by the present invention, the wall 1a located at the hinge end of the case 1 is provided at its mating edge with a centrally located duct 1b. Duct 1b receives a central web 3a on the camera back 3 to form the labyrinth seal. As shown in the embodiment of FIG. 2, the mutual spacing and geometry of the parts 1a, 1b, 3a, of base 1 and cover 3, respectively, by which the labyrinth seal is formed, enable the front end 5a of the film 5 to be pulled out of the seal during the film advance operation even if the camera back 3 has been closed. As seen in FIG. 2, web 3a has a length sufficient to prevent light from entering the camera interior when the camera back 3 is closed. However, a clearance is provided between the respective mating parts of the case and back walls along the entire cross section of the labyrinth seal to define a tortuous path of sufficient width to enable the film end to be withdrawn from the seal through the path.

In the alternate embodiment shown in FIG. 3, the structure shown is identical to that of FIG. 2 except that there is provided a strip 6 formed of flexible or resilient material such as plastic or felt comprising the interior surface forming the duct 1b. A web 7, also made of flexible material, is secured in a recess 3b on the cover 3. The strip 6 and web 7 are in a normally upright position sealing the camera interior from light. However, if the film end 5a were caught within the seal, strip 6 and web 7 would flex sufficiently to permit withdrawal during film wind. This construction provides a dependable light seal even if production tolerances are wide, without impeding withdrawal of the film end 5a if it were to have become caught within the seal. Further, even though the light seal may be broken while the strip and web are flexed, the film end portion between the resilient material improves the seal, and in any event, this situation exists only during initial film wind of the leader when the light seal is not as critical.

It is apparent, however, that modification to the preferred embodiments can be employed without departing from the spirit of the invention or the scope of the claims.

We claim:

1. In a camera having a case part and a closable cover cooperative with the case part to define a film receiving recess for enclosing film takeup means, the case part and cover including edges mateable to prevent light from entering said film receiving recess when said cover is closed; the improvement comprising: means on said mating edges simultaneously defining while said cover is closed both a labyrinth light seal and a clearance of sufficient size to provide a film release path at least in the portion adjacent said takeup means, through which path any part of the film that may have entered between said case part and cover edges can be withdrawn into said recess by said takeup means.

2. The improvement as defined in claim 1 wherein said means on said mating edges comprise resilient members adapted to flex during withdrawal of the film into said recess.

3. The improvement as defined in claim 1 wherein said labyrinth seal comprises:
   a. means on one of said case part and cover defining a centrally located duct; and
   b. a web on the other of said case part and cover, said web being positioned to lie in said duct when said cover is closed.

4. The improvement as defined in claim 3 wherein said duct defining means and said web define said clearance through which the film may be withdrawn into said recess while said cover is closed.

5. The improvement as defined in claim 3 wherein at least said web and the interior side of said duct defining means are formed of resilient material adapted to flex during withdrawal of the film into said recess.